(12) United States Patent
Park et al.

(10) Patent No.: US 11,340,700 B2
(45) Date of Patent: *May 24, 2022

(54) METHOD AND APPARATUS WITH IMAGE AUGMENTATION

(71) Applicant: Samsung Electronics Co., Ltd., Suwon-si (KR)

(72) Inventors: Seungin Park, Yongin-si (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,850

(22) Filed: Feb. 14, 2020

(65) Prior Publication Data

US 2021/0064127 A1 Mar. 4, 2021

(30) Foreign Application Priority Data

Aug. 26, 2019 (KR) .................. 10-2019-0104564

(51) Int. Cl.
*G06F 3/01* (2006.01)
*G06K 9/62* (2022.01)
*G06T 11/00* (2006.01)
*G06T 3/40* (2006.01)
(Continued)

(52) U.S. Cl.
CPC .............. *G06F 3/013* (2013.01); *G06K 9/629* (2013.01); *G06K 9/6217* (2013.01);
(Continued)

(58) Field of Classification Search
None
See application file for complete search history.

(56) References Cited

U.S. PATENT DOCUMENTS

| 10,019,057 | B2 | 7/2018 | Osman et al. |
| 2017/0262154 | A1 | 9/2017 | Black et al. |

(Continued)

FOREIGN PATENT DOCUMENTS

| JP | 5915981 B2 | 5/2016 |
| KR | 1998-0004114 A | 3/1998 |

(Continued)

OTHER PUBLICATIONS

Yarbus, Alfred L., "Eye Movements and Vision", Institute for Problems of Information Transmission Academy of Sciences of the USSR, Moscow, 1967 (121 pages in English).

(Continued)

*Primary Examiner* — Yanna Wu
(74) *Attorney, Agent, or Firm* — NSIP Law

(57) ABSTRACT

A method with image augmentation includes recognizing, based on a gaze of the user corresponding to the input image, any one or any combination of any two or more of an object of interest of a user, a situation of the object of interest, and a task of the user from partial regions of an input image determining relevant information indicating an intention of the user, based on any two or any other combination of the object of interest of the user, the situation of the object of interest, and the task of the user, and generating a visually augmented image by visually augmenting the input image based on the relevant information.

21 Claims, 11 Drawing Sheets

(51) Int. Cl.
*G06V 10/40* (2022.01)
*G06V 40/20* (2022.01)

(52) U.S. Cl.
CPC .............. *G06K 9/6267* (2013.01); *G06T 3/40* (2013.01); *G06T 11/00* (2013.01); *G06V 10/40* (2022.01); *G06V 40/20* (2022.01)

(56) References Cited

U.S. PATENT DOCUMENTS

| | | | |
|---|---|---|---|
| 2017/0308751 A1 | 10/2017 | Kim et al. | |
| 2018/0150681 A1* | 5/2018 | Wang | G06K 9/4628 |
| 2018/0181811 A1* | 6/2018 | Yakishyn | G06F 3/013 |
| 2019/0134812 A1* | 5/2019 | Kim | B25J 19/02 |
| 2020/0409451 A1* | 12/2020 | Mukherjea | G06Q 10/06398 |

FOREIGN PATENT DOCUMENTS

| | | | |
|---|---|---|---|
| KR | 10-2016-0068916 A | 6/2016 |
| KR | 10-2021-0009066 A | 1/2021 |
| KR | 10-2021-0009458 A | 1/2021 |

OTHER PUBLICATIONS

Johansson, Roland S. et al., "Eye-Hand Coordination in Object Manipulation", The Journal of Neuroscience, Sep. 1, 2001 (pp. 6917-6932).

Haji-Abolhassani, Amin et al., "An inverse Yarbus process: Predicting observers' task from eye movement patterns." *Vision research*, vol. 103, Oct. 2014 (pp. 127-142).

\* cited by examiner

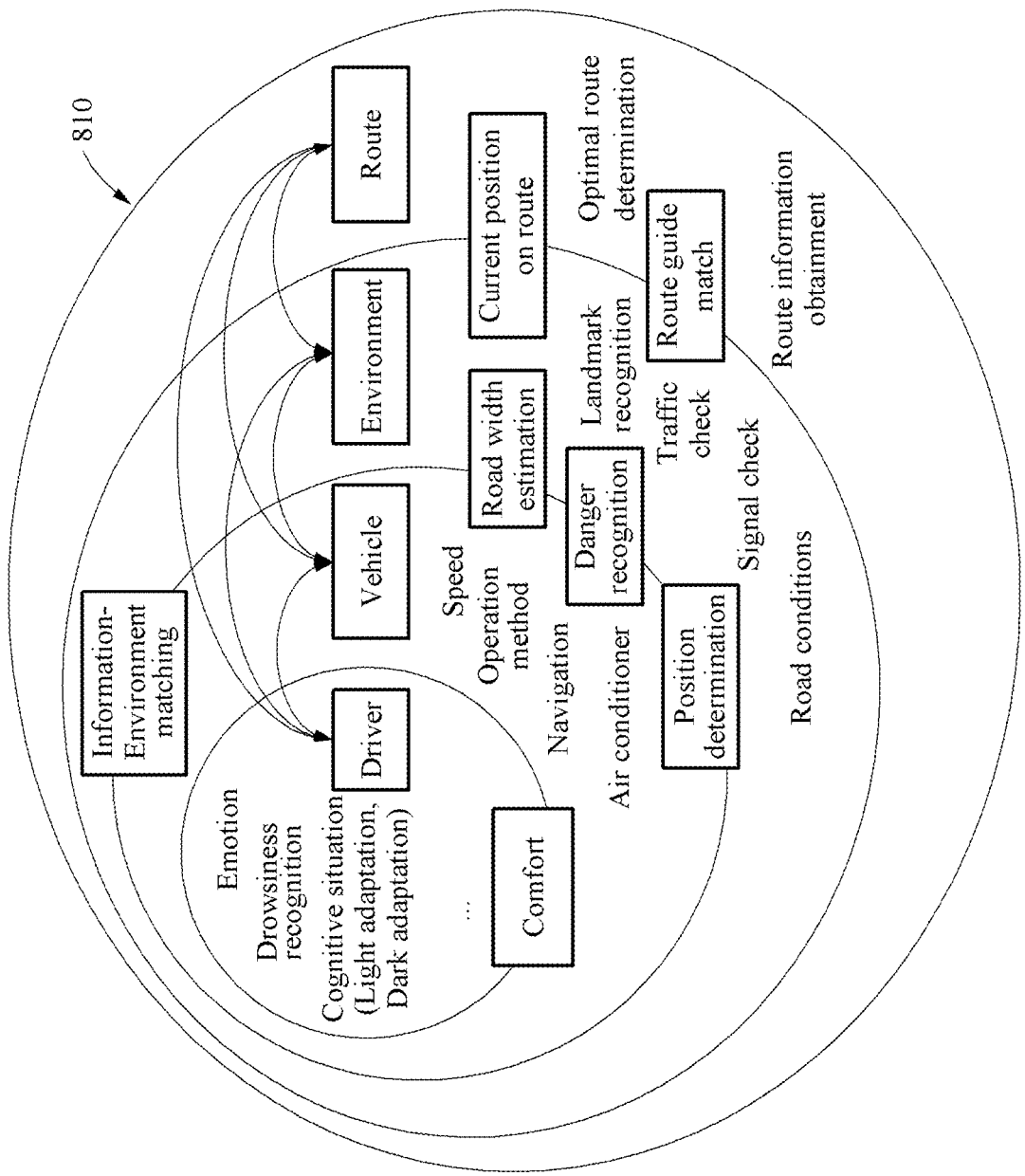

FIG. 8B

| Target/Relation | Search | Identification | Match | Measurement |
|---|---|---|---|---|
| Route | Route search | | | |
| Route-Environment | | Optimal route determination | Current position identification Route comparison | |
| Environment | Nearby building search Traffic sign search | Distant traffic sign identification Landmark recognition | | Road width detection |
| Environment-Vehicle | Detour search Lane search | Collision determination | Parking lot check | Determine whether to pass narrow path |
| Vehicle | IVI control button search | | I/F comparison (Sharing, etc.) | Vehicle width recognition |
| Vehicle-Driver | | Sight check (Rear-view/side-view mirrors) | | |
| Driver | | Drowsiness recognition | | |

830

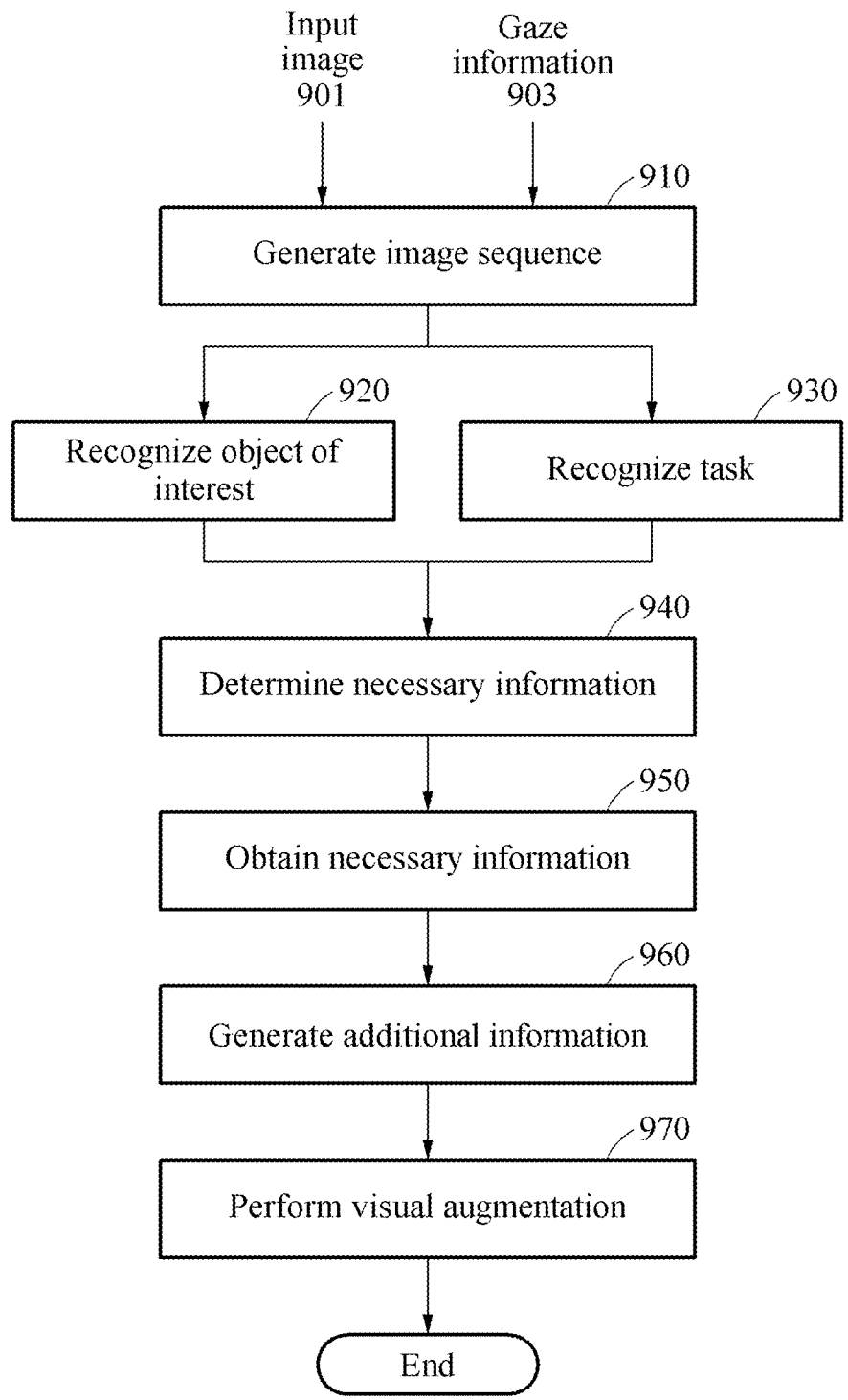

Zoom in distant information
Restore occlusion information

Emphasize lane/object silhouette
Mixed rendering + Image restoration

Induce forced light adaptation
through advance brightness enhancement
(+ Adjust camera sensitivity)

METHOD AND APPARATUS WITH IMAGE AUGMENTATION

CROSS-REFERENCE TO RELATED APPLICATIONS

This application claims the benefit under 35 USC § 119(a) of Korean Patent Application No. 10-2019-0104564 filed on Aug. 26, 2019 in the Korean Intellectual Property Office, the entire disclosure of which is incorporated herein by reference for all purposes.

BACKGROUND

1. Field

The following description relates to a method and apparatus with image augmentation.

2. Description of Related Art

When an image and information used for a user are matched and displayed automatically without explicit user input on an augmented reality (AR) application image, depending on information used for the user, the user may perform a corresponding different cognitive task.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of augmenting an image includes recognizing, based on a gaze of the user corresponding to the input image, any one or any combination of any two or more of an object of interest of a user, a situation of the object of interest, and a task of the user from partial regions of an input image, determining relevant information indicating an intention of the user, based on any two or any other combination of the object of interest of the user, the situation of the object of interest, and the task of the user, and generating a visually augmented image by visually augmenting the input image based on the relevant information.

The recognizing may include generating, based on the image sequence, an image sequence including partial regions of the input image based on the gaze of the user, and recognizing any one or any combination of any two or more of the object of interest of the user, the situation of the object of interest, and the task of the user.

The generating may include extracting partial images mapped to the gaze of the user from the input image, and generating the image sequence by sequentially combining the partial images.

The extracting may include extracting the partial images based on gaze information on which the gaze of the user is determined in the input image input at each timestep of timesteps used to track the gaze of the user.

The recognizing may include recognizing either one or both of the situation of the object of interest and the object of interest included in the image sequence by applying the image sequence to a first neural network configured to perform object recognition, and recognizing a task being performed by the user by applying the image sequence to a second neural network configured to perform task recognition.

The recognizing of the task may include generating a coded image by visually encoding temporal information included in each gaze corresponding to the image sequence, and predicting the task being performed by the user based on the image sequence and the coded image.

The temporal information may include any one or any combination of any two or more of a gaze trajectory, a velocity during eye movements, a duration of each fixation, whether the fixations are repeated on the partial regions, a count of recurrent/repeated fixations, an interval of the recurrent/repeated fixations, and a coverage area of the fixations.

The generating of the coded image may include generating coded partial images by encoding the temporal information to each RGB channel in partial regions to which gazes corresponding to the image sequence are mapped in the input image, and generating the coded image by combining the coded partial images.

The predicting may include obtaining feature vectors corresponding to the image sequence based on the image sequence and the coded image, and classifying the task based on the feature vectors.

The obtaining may include extracting first feature vectors from partial regions to which gazes corresponding to the image sequence are mapped, extracting second feature vectors based on the coded image, and obtaining feature vectors corresponding to the image sequence by concatenating the first feature vectors and the second feature vectors.

The situation of the object of interest may include a situation in which any one or any combination of any two or more of occlusion, blur, distortion caused by rain, low illumination, and light reflection occurs with respect to the object of interest in the image sequence.

The task of the user may include any one or any combination of any two or more of search, object identification, matching, counting, measurement, and freely viewing.

The recognizing may include setting a first window region and a second window region corresponding to partial regions of different sizes in the input image, the second window region being larger than the first window region, resizing a resolution of the second window region by downsampling the second window region, detecting a first object candidate from the first window region, and detecting a second object candidate from the downsampled second window region, and recognizing the object of interest included in the input image based on either one or both of the first object candidate and the second object candidate.

The determining may include determining a descriptor corresponding to the object of interest of the user and the situation of the object of interest, and determining the relevant information by searching a table for a result of combining the descriptor and the task of the user, the table indicating information of a relationship between the object of interest and the task of the user.

The visually augmenting may include either one or both of visually augmenting the input image by matching the relevant information to the input image, and visually augmenting the input image by correcting the input image based on the relevant information.

The visually augmenting may include visually augmenting the input image by selectively providing additional information for each determined situation corresponding to the relevant information.

The method may further include acquiring the input image and gaze information including a gaze of the user corresponding to the input image.

The method may further include outputting the visually augmented image.

In another general aspect, non-transitory computer-readable storage medium storing instructions that, when executed by one or more processors, configured the one or more processors to perform the method described above.

In another general aspect, an apparatus with image augmentation includes a communication interface configured to acquire an input image and gaze information including a gaze of a user corresponding to the input image, one or more processors configured to recognize, based on the gaze of the user corresponding to the input image, any one or any combination of an object of interest of the user, a situation of the object of interest, and a task of the user from partial regions of the input image, determine relevant information indicating an intention of the user, based on any two or any combination of the object of interest of the user, the situation of the object of interest, and the task of the user, and visually augment the input image based on the relevant information, and a display configured to display the visually augmented image.

In another general aspect, a processor-implemented method with image augmentation includes recognizing, based on a gaze of the user corresponding to the input image, characteristics of a user from partial regions of an input image, determining relevant information used for the user, based on the recognized characteristics of the user, visually augmenting the input image based on the relevant information, and outputting the visually augmented image.

The characteristics of the user may include any one or any combination of any two or more of an object of interest of a user, a situation of the object of interest, and a task of the user from partial regions of an input image.

The recognizing may include generating an image sequence including partial regions of the input image based on the gaze of the user, and recognizing any one or any combination of any two or more of the object of interest of the user, the situation of the object of interest, and the task of the user, based on the image sequence.

The generating may include extracting partial images mapped to the gaze of the user from the input image, and generating the image sequence by sequentially combining the partial images.

The method may further include outputting the visually augmented image.

Other features and aspects will be apparent from the following detailed description, the drawings, and the claims.

BRIEF DESCRIPTION OF THE DRAWINGS

FIGS. 8A and 8B illustrate an example of a determining of relevant information.

FIG. 9 illustrates an example of a method with image augmentation.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
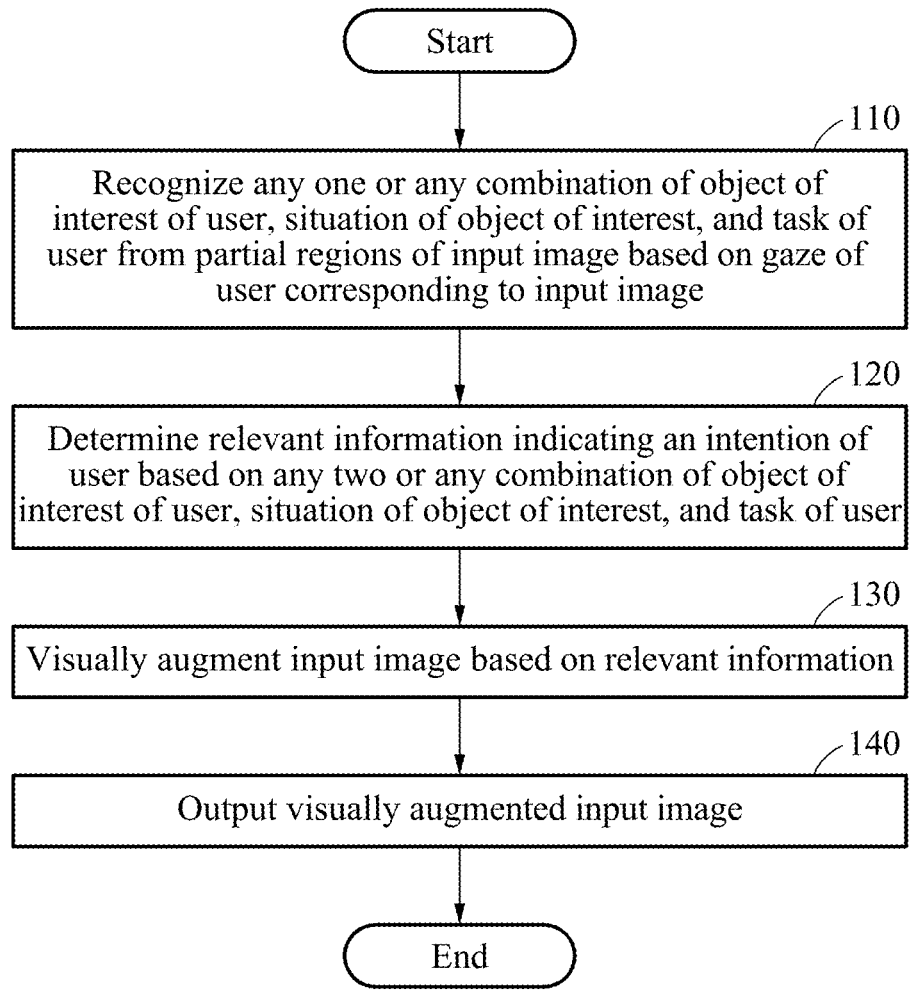
FIG. 1 illustrates an example of a method with image augmentation.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The features of the examples described herein may be combined in various ways as will be apparent after an understanding of the disclosure of this application. Further, although the examples described herein have a variety of configurations, other configurations are possible as will be apparent after an understanding of the disclosure of this application.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, operations, elements, and/or components, but do not preclude the presence or addition of one or more other features, integers, operations, elements, components and/or groups thereof.

Unless otherwise defined, all terms including technical and scientific terms used herein have the same meaning as commonly understood by one of ordinary skill in the art to which examples belong after an understanding of the disclosure of the present application. It will be further understood that terms, such as those defined in commonly-used dictionaries, should be interpreted as having a meaning that is consistent with their meaning in the context of the relevant art and the disclosure of the present application and are not to be interpreted in an idealized or overly formal sense unless expressly so defined herein.

Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

Further, the user may exhibit a different visual attention pattern for a different cognitive task. For example, a gaze may be a fast sensory cue that is closely associated with visual attention. Thus, by analyzing the user's gaze trajectories, it may be possible to distinguish an intention of the user and/or the information used for the user. Accordingly, it may be possible to use such analytic conclusions to gather information about the user that facilitates better service for such a user.

FIG. 1 illustrates an example of a method image with image augmentation. Referring to the example of FIG. 1, in operation 110, an apparatus with image augmentation, hereinafter, the "augmentation apparatus," recognizes any one or any combination of an object of interest of a user, a situation of the object of interest, and a task of the user from partial regions of an input image based on a gaze of the user corresponding to the input image. The input image may be, for example, a camera image with respect to a region visible to the user. The gaze of the user may correspond to gaze information of the user mapped to the input image, and may include gaze information related to a plurality of gazes. For example, the gaze of the user may be sensed by an eye tracker or an iris sensor. However, examples are not limited to these sensors, and other appropriate sensors or operations that track the gaze of the user may be used or applied in other examples.

For example, the "object of interest" may be a displayed or captured object corresponding to coordinates or a region to which the gaze of the user is fixated in the input image. Thus, the "object of interest" may correspond to, for example, a vehicle, a traffic sign, a road, or a pedestrian. However, examples are not limited to these listed examples, and the "object of interest" may also refer to another portion of the input image upon which the gaze of the user is fixated.

Similarly, the "situation of the object of interest" may include a situation faced by the object of interest, a surrounding situation of the object of interest, and all image situations corresponding to objects of interest included in such an image sequence. As examples, the situation of the object of interest may include, for example, a driving situation, a state of navigation, a state of an air conditioner, a situation of checking an optimal route, and a situation of obtaining route information. As further examples, the situation of the object of interest may include, for example, situations in which occlusion, blur, distortion caused by rain, low illumination, and light reflection occur with respect to the object of interest in the image sequence.

Depending on a situation, the content of the input image may be modified differently. These situations may modify the content of the input images in the image sequence in that they change visibility when acquiring the images. For example, the occurred light reflection may include all reflections occurring because of sunlight and/or one or more illumination lights. A state in which light reflection occurs may also include a state in which light reflection simply occurs by itself as a natural reflection in an image, and also a state in which a change in illuminance occurs in the object of interest. Thus, in general, examples of the "situation of the object of interest" are not limited to the above examples, but instead include examples, appropriately, of conditions similar to the above examples in which the context of obtaining images affects the image content, as a non-limiting example.

The "task of the user" may correspond to a task performed while the gaze of the user is fixated onto the input image, or an intention of the user fixating his or her gaze onto the input image. The task of the user may also be referred to as an "intention of the user." The task of the user may include, for example, searching, object identification, matching, counting, measurement, and freely viewing portions of the image. However, examples are not limited to these particular examples, and may also include other tasks corresponding to the objectives of the user that lead the user to gaze at portions of images within the user's visual field.

In operation 110, the augmentation apparatus may generate an image sequence including the partial regions of the input image, based on the gaze of the user. An example of generating the image sequence by the augmentation apparatus is described in greater detail further below with reference to the example of FIG. 3. The augmentation apparatus may recognize any one or any combination of any two or more of the object of interest of the user, the situation of the object of interest, and the task of the user based on the image sequence. For example, the augmentation apparatus may recognize one or more of the situation of the object of interest and the object of interest included in the image sequence by applying the image sequence to a first neural network correspondingly trained for such example objects' recognition. Further, the augmentation apparatus may recognize a task being performed by the user by applying the image sequence to a machine learning model, e.g., second neural network correspondingly trained for such example task recognition. The machine learning model may include, for example, a classifier for processing sequence data of the image sequence. Such a classifier may be configured as, for example, a support vector machine (SVM) or a deep neural network (DNN). For example, such a DNN may be a recurrent neural network (RNN), a long short-term memory (LSTM) or a differential neural network (DNC), in non-limiting examples. However, these are only examples of machine learning classifiers, and other types of machine learning classifiers may also be used in other examples. An example of recognizing any one or any combination of the object of interest of the user, the situation of the object of interest, and the task of the user by the augmentation apparatus are described in greater detail further below with reference to the examples of FIGS. 4 through 7.

In operation 120, the augmentation apparatus may determine relevant information indicating an intention of the user, based on any two or any other combination of more than two of the object of interest of the user, the situation of the object of interest, and the task of the user. The augmentation apparatus may identify the task currently being performed by the user based on the gaze of the user, and may combine the task of the user with the object of interest of the user and/or the situation of the object of interest, thereby determining the relevant information to better serve the user's desires and goals, without explicit input from the user. An example of determining the relevant information by the augmentation apparatus is described further, below, with reference to the examples of FIGS. 8A and 8B.

In operation 130, the augmentation apparatus may visually augment the input image based on the relevant information. For example, the augmentation apparatus may visually augment the input image by matching the relevant information to the input image. In such an example, "matching the relevant information to the input image" may refer to adding the relevant information to the input image, combining the relevant information with the input image, and/or overlaying the relevant information on the input image, e.g., such as an augmented reality (AR) embodiment. Further, the augmentation apparatus may visually augment the input image by correcting the input image based on the relevant information.

In an example, the augmentation apparatus may visually augment the input image by selectively providing additional information for each situation corresponding to the relevant information. For example, the relevant information may be lane information obtained in association with map information of a road on which a driver is currently traveling. In such an example, the additional information beyond the relevant information may be a generated surface model of the road surface used for accurately and successfully overlaying an emphasized lane onto a lane displayed in the input image.

In operation 140, the augmentation apparatus may display the visually augmented image. In such an example, the "visually augmented image" may be an image restored from a low illuminance to a high illuminance, an image zoomed in from a long distance to a short distance, an image displaying map information corresponding to the input image together with the input image, an image displaying additional information associated with the map information together with the input image, an image displaying information and/or an image of an object of interest occluded in the input image so as to be overlaid on the input image, and/or the input image corrected by the information and/or the image of the occluded object of interest. However, examples are not limited to these listed examples, and other visual augmentations to the visually augmented image may be used in other examples, in which the image is visually modified and/or augmented to focus on and/or highlight aspects of the object of interest.

For example, the augmentation apparatus may selectively augment and display the relevant information, thereby supporting accurate situation determination and/or action determination of the user. Examples of images visually augmented by the augmentation apparatus are described in further detail with reference to the examples of FIGS. 10A through 10C.

The augmentation apparatus may be utilized in augmented reality (AR) application fields requiring establishment of a natural user interface based on a gaze of a user, or processing of an image sequence like a visual perception augmentation system. However, applications of the augmentation apparatus are not limited to such application fields, and the augmentation apparatus may be used appropriately in any field in which its properties are advantageous.

Figure 2:
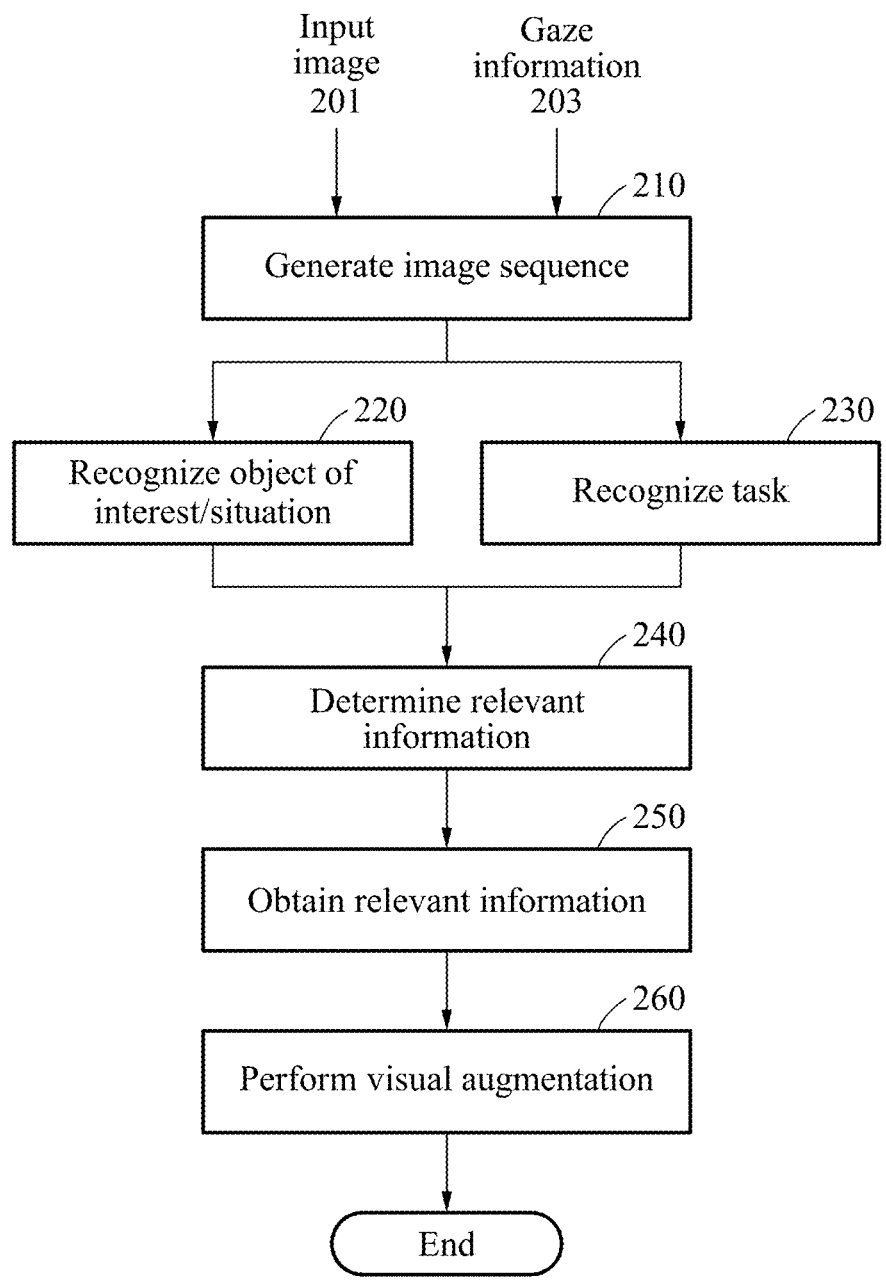
FIG. 2 illustrates an example of a method with image augmentation.

FIG. 2 illustrates an example of a method of augmenting an image. Referring to the example of FIG. 2, an input image 201 with respect to a region visible to a user, and gaze information 203 including a gaze point to which a gaze of the user is fixated in the input image 201 may be input into an augmentation apparatus, e.g., the augmenting apparatus 1100 of FIG. 11. In response to provision of the input image 201 and the gaze information 203, the augmentation apparatus may generate an image sequence by extracting partial regions around the gaze point from the input image 201. For example, the image sequence may be generated by sequentially combining partial images corresponding to the partial regions of the input image. However, other approaches, such as the use of additional information may be used in other examples as appropriate to help allow the generation of the image sequence.

In operation 220, the augmentation apparatus may recognize a type of an object of interest present in the image and/or a situation of the object of interest, by inputting the image sequence or the image sequence and gaze information, into a DNN for object recognition. For example, the augmentation apparatus may recognize that an object of interest to which a driver gives attention in a driving environment is a traffic sign, and may recognize that a situation of the object of interest is a state in which the traffic sign is occluded by street trees. However, these are only examples, and other recognition examples occur, as appropriate, in other use cases.

In addition, in operation 230, the augmentation apparatus may recognize a task being performed by the user, that is, the task, action, or intent/desire of the user, based on the image sequence. For example, the augmentation apparatus may determine that the driver is performing an object identification task of identifying an object of interest, by inputting the image sequence into a classifier trained to classify respective tasks. Operation 220 and operation 230 may be performed at the same time, or may be performed at times separated by a time interval from one another.

In operation 240, the augmentation apparatus may determine relevant information to be provided, or made available, or intuited desired for the user by integrating the type of the object of interest recognized in operation 220 and/or the situation of the object of interest with the task of the user recognized in operation 230. For example, the type of the object of interest may a traffic sign, the situation of the object of interest may a state in which the traffic sign is occluded, and the task of the user may be object identification. In such an example, the augmentation apparatus may determine that the user would desire information about the occluded portion of the traffic sign by integrating the type of the object of interest and/or the situation of the object of interest with the task of the user. Accordingly, the augmentation apparatus may determine the information about the occluded portion of the traffic sign to be the relevant information. In such an example, the information about the occluded portion of the traffic sign may include image information about the occluded portion of the traffic sign, the position of the traffic sign, the type of the traffic sign, content written on the traffic sign, and various other information, as appropriate.

In operation 250, the augmentation apparatus may obtain the relevant information. For example, the augmentation apparatus may obtain an image of the occluded portion of the traffic sign corresponding to the object of interest and/or information related to the traffic sign, by concatenating the image sequence with map information of a road on which the user, that is, the driver, is currently traveling. In such an example, the augmentation apparatus may obtain additional information for each situation corresponding to the relevant information, in addition to the relevant information, as determined in operation 240.

In operation 260, the augmentation apparatus may perform visual augmentation with respect to the input image, based on the relevant information obtained in operation 250. The augmentation apparatus may display the input image on a display by matching the obtained relevant information to the input image. The augmentation apparatus may perform the visual augmentation with respect to the input image by restoring the image of the occluded portion of the traffic sign and also overlaying the restored image on the input image.

Figure 3:
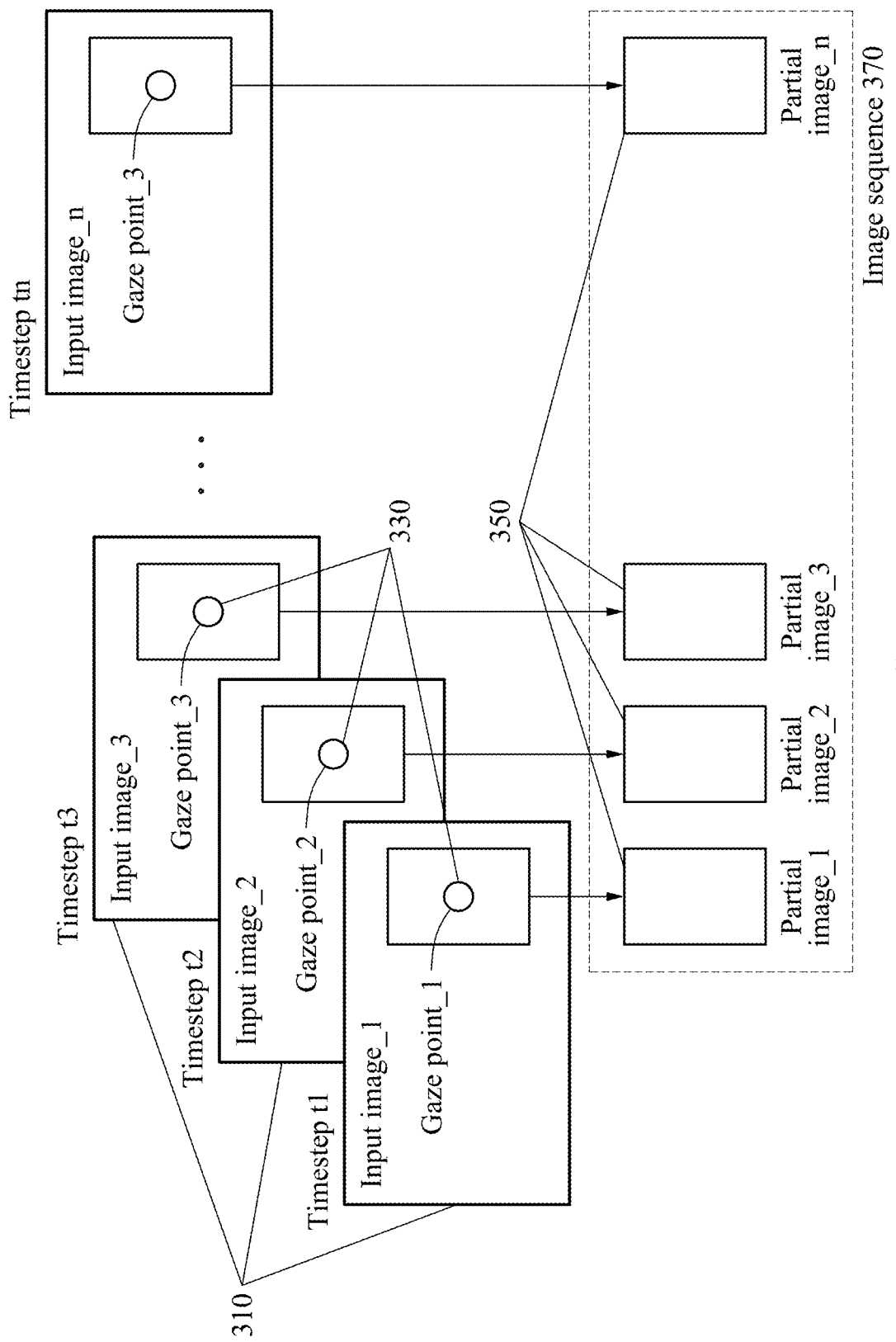
FIG. 3 illustrates an example of a generating of an image sequence.

FIG. 3 illustrates an example of generating an image sequence. Referring to the example of FIG. 3, input images 310 input at respective timesteps t, gaze information 330 including positions at which a gaze is fixated in the input images 310, partial images 350, and an image sequence 370 are illustrated as aspects of such an example. In the example of FIG. 3, the gaze information 330 may include determined/detected coordinates of gaze points to which the gaze is fixated in the input images 310.

An augmentation apparatus may generate the partial images 350 by extracting image regions of a predetermined size based on the coordinates of the determined/detected gaze points onto which the gaze of the user is fixated in the input images 310 input at respective timesteps t. In such an example, the image regions of the predetermined size may correspond to partial regions of the input images 310. The augmentation apparatus may generate a single image sequence 370 by sequentially combining the partial images 350 corresponding to the respective timesteps in a determined suitable order of input.

Temporal information included in the gaze in the single image sequence 370 generated by the partial images 350 may be handled in the form of successive information. By proceeding in such a manner, the accuracy of the eye tracker may increase, and errors in gaze position caused by synchronization and/or latency may be reduced or minimized.

Figure 4:
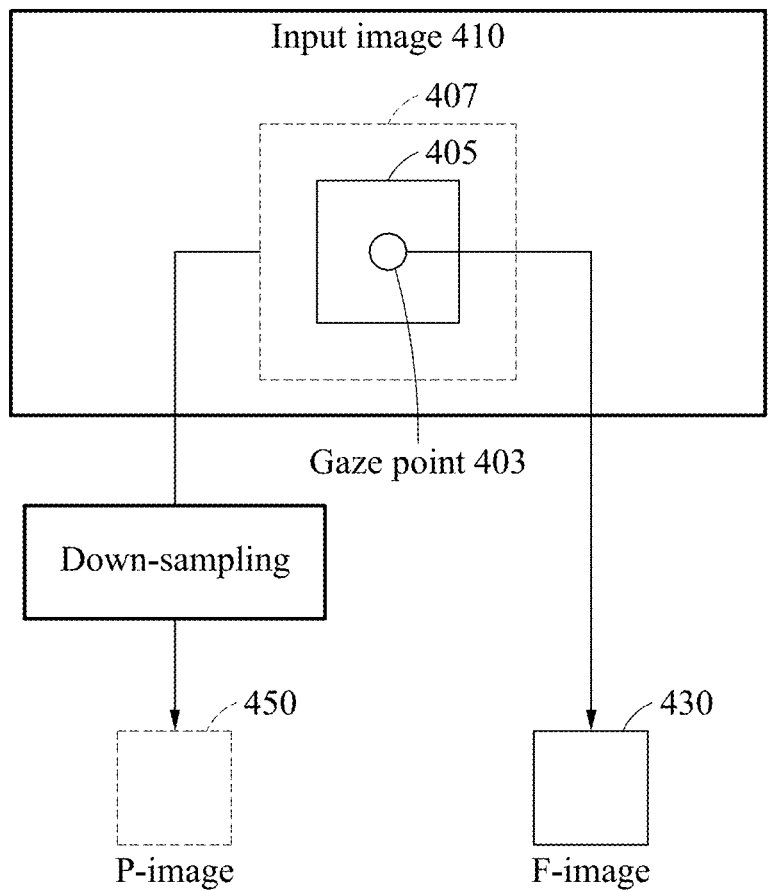
FIG. 4 illustrates an example of a recognizing of an object of interest of a user, and a situation of the object of interest.

FIG. 4 illustrates an example of recognizing an object of interest of a user, and a situation of the object of interest. Referring to the example of FIG. 4, an input image 410, a gaze point 403 of a user with respect to the input image 410, a first window region 405, a second window region 407, a foveated (F)-image 410, and a peripheral (P)-image 450 are illustrated. The F-image 430 may also be referred to as the "first image." Here, foveated imaging is a digital image processing technique in which the image resolution or amount of detail varies across the image according to one or more "fixation points," for example. The P-image 450 may also be referred to as the "second image." For example, the input image 410 may correspond to the image sequence described above or partial images included in the image sequence.

An augmentation apparatus may recognize at least one of an object of interest included in the input image 410 and a situation of the object of interest, by applying the input image 410 to a first neural network for object recognition, e.g., as discussed further above. In such a non-limiting example, an object detection method based on deep learning such as, for example, a convolutional neural network (CNN) or an RNN, may be used as the first neural network. In addition, various algorithms and/or structures may be used for object recognition, and the recognition is not necessarily limited to the deep learning techniques. The CNN may include, as non-limiting examples, Single Shot Detector (SSD), and You Only Look Once (YOLO) approaches. The first neural network may detect the object of interest from the partial images included in the input image 410. In addition to detecting the object of interest from the partial images, the first neural network may also detect the situation of the object of interest, such as situations in which occlusion, blur, distortion caused by rain, low illumination, and light reflection occur with respect to the object of interest.

In further detail, in response to the input image 410 and information about the gaze point 403 of the user corresponding to the input image 410 being provided, the augmentation apparatus may set two window regions of different sizes, for example, the first window region 405 and the second window region 407, based on the gaze point 403 of the user. For example, the augmentation apparatus may set the first window region 405 and the second window region 407 to have different sizes based on the gaze point 403 of the user with respect to the input image 410. In such an example, the second window region 407 may be larger than the first window region 405.

The first window region 405 may be a region for recognizing an object with a size smaller than a preset size, and may correspond to a foveated region, for example. The preset size may vary, depending on a general size of object type to be recognized and/or detected. The F-image 430 may be extracted from the first window region 405. The size of the F-image 430 may be, for example, 50×50 pixels. However, this is only an example, and other sizes may be used, as appropriate, in other examples. For example, the F-image 430 extracted from the first window region 405 may have a resolution the same as that of the input image 410. The F-image 430 for recognizing an object with such as small size maintains the resolution of the input image 410, and thus there may be no dataloss caused by downsampling of the entire input image 410, whereby the detection accuracy improves accordingly.

The second window region 407 may be a region for recognizing an object with a size greater than the preset size, and may correspond to a peripheral region. The second window region may correspond to a region for detecting an object of a relatively great size by setting a region in a wider range with respect to an object of a size not covered by the first window region. In such an example, such a "preset size" may be a size for distinguishing an object of a size covered by the first window region and an object of a size not covered by the first window region and may be, for example, a size of 50×50 pixels, though as discussed, other sizes may also be used as appropriate.

The P-image 450 may be extracted from the second window region 407. The P-image 450 extracted from the second window region 407 may also have a resolution lower than that of the input image 410. The size of the P-image 450 may be, for example, 350×350 pixels.

The augmentation apparatus may resize the second window region by down-sampling the second window region. In an example, the second window region 407 may be set to have a size greater than the first window region 405, and an image corresponding to the second window region 407 may be downsampled to have a size, e.g., a pixel resolution size, the same as that of the F-image 430 before input into a neural network, such that the P-image 450 may share a base network for object detection along with the F-image 430, e.g. corresponding to a pixel resolution of an input later of the neural network shared base. In such an example, the P-image 450 may correspond to an image acquired by resizing an image including a big object to a smaller size and thus, may reduce a computational load of the neural network. However, in examples, the size of the P-image 450 is not necessarily the same as the size of the F-image 430. As appropriate, the P-image 450 and the F-image 430 may thus be resized is various ways.

For example, the sizes of the window regions may be determined based on a type of an object to be detected from an input image, a field of view (FoV), or camera distance information corresponding to the input image, depending on an application field. However, these are only examples, and other ways of determining the sizes are used, as appropriate, in other examples.

In an example, a vehicle in a road environment may be intended to be recognized by an AR head-up display (HUD) or AR glasses. In such an example, a vehicle object may be included in a window region of a size of 50×50 pixels at a distance of 20 m on average. Accordingly, the size of the first window region 405 may be set to be 50×50 pixels, appropriately. Further, considering that a readable FoV may be 20 degrees and a binocular FoV may be 120 degrees, which may be at a ratio of 1:6, the P-image 450 may be extracted as having a size of 350×350 pixels and may be resized to 50×50 pixels appropriately for use. After that, the F-image 430 and the P-image 450 may be applied as inputs of a base network and may be used for inference to recognize and detect the object.

For example, the augmentation apparatus may detect a first object candidate from the first window region 405, may detect a second object candidate from the resized second window region 407, and may recognize the object of interest included in the input image, based on at least one of the first object candidate and the second object candidate, e.g., based on the first object candidate, the second object candidate, and or both the first and second object candidates.

Figure 5:
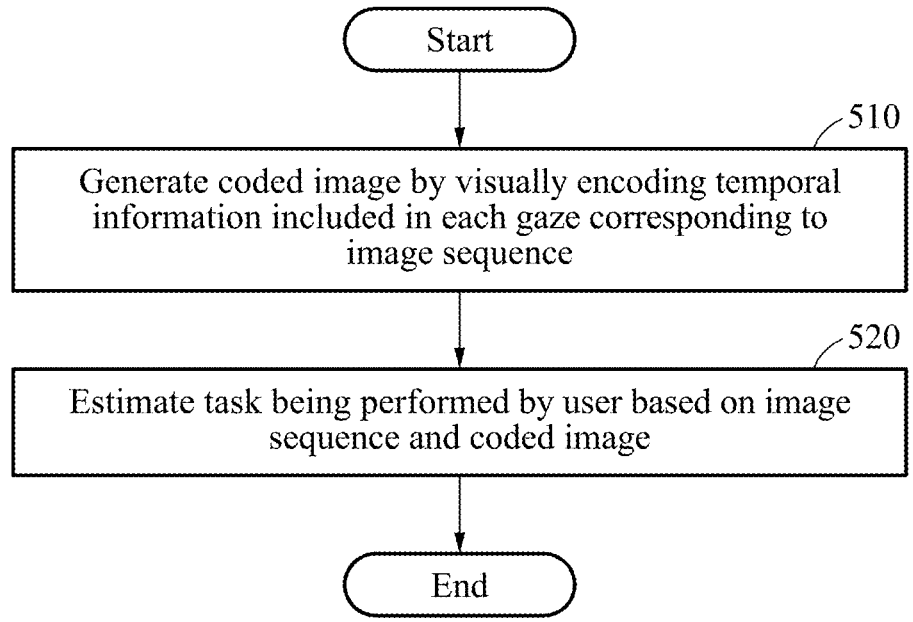
FIG. 5 illustrates an example of a recognizing of a task.

FIG. 5 illustrates an example of recognizing a task. Referring to the example of FIG. 5, in operation 510, an augmentation apparatus may generate a coded image by visually encoding temporal information included in each gaze corresponding to an image sequence. Here, the "temporal information" may include, for example, a gaze trajectory, a velocity during eye movements, a duration of each fixation, whether the fixations are repeated on the partial regions, a count of the recurrent/repeated fixations, an interval of the recurrent/repeated fixations, and a coverage of the fixations. However, these are only examples, and other appropriate examples of "temporal information" may also be used appropriately in other examples.

For example, for a more detailed example understanding, the augmentation apparatus may generate the coded partial images by encoding the temporal information to each RGB channel in partial regions to which gazes corresponding to the image sequence are mapped in the input image. The augmentation apparatus may generate the coded partial images by generating circles corresponding to the temporal information in the partial regions to which the gazes are mapped in the image sequence. The augmentation apparatus may generate the circles to have different diameters, different colors, and different intensities, based on the temporal information. The augmentation apparatus may generate the coded image by combining the coded partial images. An example of generating the coded image by the augmentation apparatus is described in greater detail further below with reference to the example of FIG. 6.

In operation 520, the augmentation apparatus may estimate a task being performed by the user, based on the image sequence and the coded image. The augmentation apparatus may obtain feature vectors corresponding to the image sequence based on the image sequence and the coded image. The augmentation apparatus may extract first feature vectors from the partial regions to which the gazes corresponding to the image sequence are mapped, for example, using a DNN. However, the DNN is only one example technique, and other examples are used in other examples, as appropriate. Also, the augmentation apparatus may extract second feature vectors based on the coded image. The augmentation apparatus may extract the second feature vectors with respect to the coded image using a general visual feature extractor, or may extract the second feature vectors using a feature extractor trained using a ground truth with respect to the image sequence. However, these are only examples, and other techniques may be used for extracting the second feature vectors that provide similar results, in other examples. Also, the augmentation apparatus may obtain feature vectors corresponding to the image sequence by concatenating the first feature vectors and the second feature vectors. Accordingly, the augmentation apparatus may classify the task of the user based on the example feature vectors.

Figure 6:
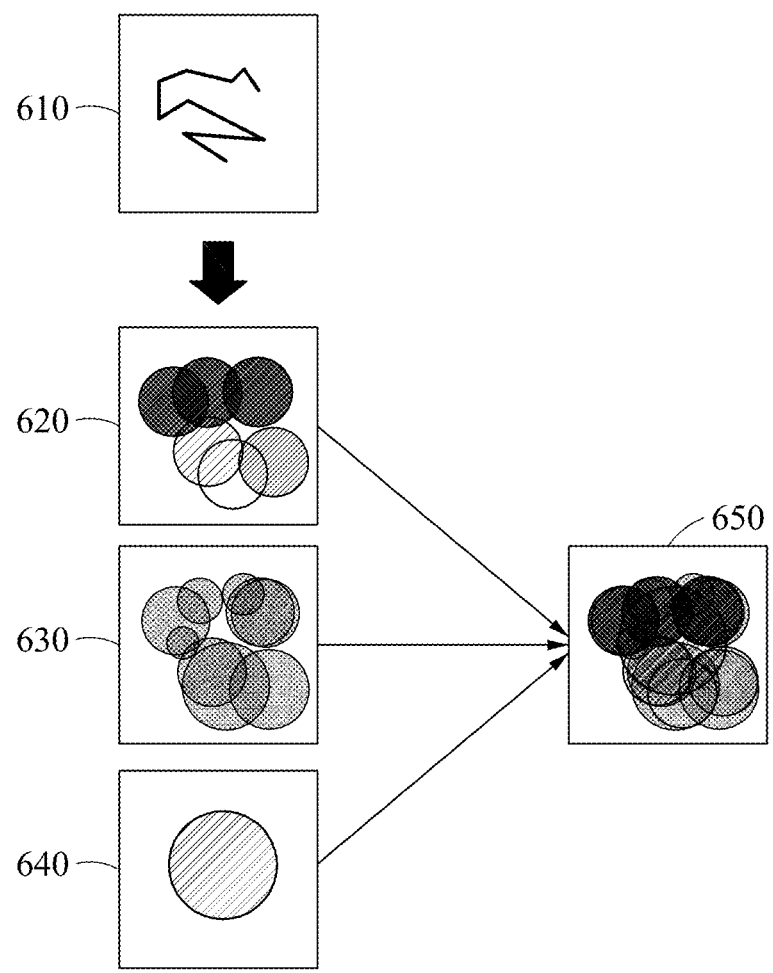
FIG. 6 illustrates an example of a generating of a coded image.

FIG. 6 illustrates an example of generating a coded image. Referring to the example of FIG. 6, a gaze sequence 610, also referred to as a gaze trajectory, coded partial images 620, 630, and 640 generated from the gaze sequence 610, and a single coded image 650 generated by combining the coded partial images 620, 630, and 640 are illustrated.

The augmentation apparatus may generate the coded partial images 620, 630, and 640 by encoding temporal information with respect to each RGB channel and/or to each intensity in partial regions to which gazes corresponding to the gaze sequence 610 are mapped.

The augmentation apparatus may generate the coded partial images 620, 630, and 640 by generating circles that correspond to the temporal information in the partial regions to which the gazes corresponding to the image sequence 610 are mapped. The augmentation apparatus may generate the circles in different diameters, different colors, and different intensities, based on the temporal information. Such different diameters, different colors, and different intensities act as visual indicators that aid in the communication of the temporal information.

For example, a gaze of a timestep t is indicated as p, a current timestep may be referred to as $t_c$, and a timestep $\Delta x$ previous to the current timestep may be referred to as $t_p$. In this example, gaze information with respect to a period from $t_p$ to $t_c$ may be generated as a single coded image in the following manner, described in greater detail below.

The augmentation apparatus may encode a gaze trajectory, which is one item of the temporal information, with respect to a single RGB channel, as shown in the coded partial image 620. For example, the gaze trajectory may be encoded to a red (R) channel. The augmentation apparatus may generate a circle C having a radius r in each partial region to which each gaze p is mapped in the input image. The augmentation apparatus may represent a color intensity value of each circle C differently based on a time t. For example, the significance and/or relevance of the information may decay over time. In such an example, an intensity of a circle $C_c$ by a gaze $p_c$ at the current timestep $t_c$ is set to a greatest value, and an intensity of a circle $C_p$ by a gaze $p_p$ at the previous timestep $t_p$ is set to a smallest value.

For example, when 8 bits are provided for each channel in a 24 bit RGB image, each channel may have an integer range of 0 to 255. Thus, the augmentation apparatus may set an intensity value of the circle $C_c$ to be 255, and set an intensity value of the circle $C_p$ to be 0. The augmentation apparatus may represent an intensity value of a circle expressing the gaze p during the period from $t_p$ to $t_c$ in view of a period $\Delta x$ between the current timestep $t_c$ and the previous timestep $t_p$ and the intensity value of the circle $C_c$ at the current timestep.

The augmentation apparatus may also set all the intensity values of the circles in correspondence with the gazes at timesteps of the entire period in the same manner, without considering decay of information over time, depending on an application field of the augmentation apparatus.

For example, the augmentation apparatus may encode a duration of each fixation, and a velocity during eye movements, of the temporal information, along with the coded partial image 330 with respect to a single RGB channel. The duration of each fixation may be encoded, for example, to a blue (B) channel. In such an example, the augmentation apparatus may generate circles having the same intensity at a position of each gaze p. When the gaze revisits the partial region or the duration of each fixation increases, the augmentation apparatus may generate overlapping circles in the partial region accordingly, and thus intensity values of the circles may be accumulated and increase as a result. For example, the augmentation apparatus may set a radius of a circle to be relatively small when the velocity during eye movements is fast, and may set a radius of a circle to be relatively large when the velocity during eye movements is slow, thereby representing a weight or relative importance of attention of the user in the coded partial image 630 based on the velocity during eye movements.

The augmentation apparatus may encode a coverage of the fixations, each of which is one item of the temporal information, to a single RGB channel, as shown in the coded partial image 640. The coverage of the fixations may be encoded to a green (G) channel. The augmentation apparatus may encode the coverage of the fixations to correspond to the RGB channel using a maximum distance or an average distance of gazes p that exist during the period Δx. The augmentation apparatus may generate a circle with a greater radius and a greater intensity value as the maximum distance or the average distance of the gazes p for each timestep becomes less than a predetermined standard distance. The augmentation apparatus may generate a circle having a smaller radius and a smaller intensity value as the maximum distance or the average distance of the gazes p for each timestep becomes greater than the predetermined standard distance.

The augmentation apparatus may extract a portion in which circles overlap and may encode the portion to correspond to a single RGB channel, with respect to the circles generated for the period Δx. The augmentation apparatus may set a greater intensity value for an overlapping portion occurring at a timepoint close to the current timestep $t_c$, and may set a smaller intensity value for an overlapping portion occurring at a timepoint far from the current timestep, in view of decay of information over time.

The augmentation apparatus may generate the single coded image 650 by combining the coded partial images 620, 630, and 640, where the coded partial images 620, 630, and 640 are generated as discussed above, as a non-limiting example. The coded image 650 may be, for example, an RGB image.

The augmentation apparatus may extract a second feature from the color-encoded, coded image 650 by using a feature extractor such as, for example, a deep convolutional neural network for object recognition developed by Oxford's Visual Geometry Group (VGG), a residential neural network (ResNet), or MobileNet. However, these are only example feature extractors, and alternative feature extractors that provide comparable results to these enumerated feature extractors may be used in different examples.

Because a final purpose of classification may be different from an initial purpose of classification, e.g., where one or more initial layers may be trained to extract more detailed or less abstract, features, which can be used in a trained classification based on the same, while one more layer or final layers of the DNN may subsequently extract more abstract aspects or features that are considered in the final classification, the augmentation apparatus may adjust a network configuration of the feature extractor such that the feature extractor may remove upper layers of the feature extractor and uses only lower layers of the feature extractor to extract low-level features. For example, when there is a training database, the feature extractor may be trained or fine-tuned. However, even when said training or fine-tuning process is omitted, the augmentation apparatus may obtain discriminative feature sets for different image sequences.

For ease of description, an example of generating the coded partial images 620, 630, and 640 as the single coded image 650 has been described. However, examples are not limited thereto, and other approaches for generating the coded partial images 620, 630, and 640 as the single coded image 650 may be used in other examples. For example, the coded image 650 may be abstracted into multiple images, or may be generated in various alternative manners, for example, using multiple channels with respect to one dimension of data. Further, characteristics of the image sequence other than those in the above examples may also be imaged during the various alternatives to the processes described above.

Figure 7:
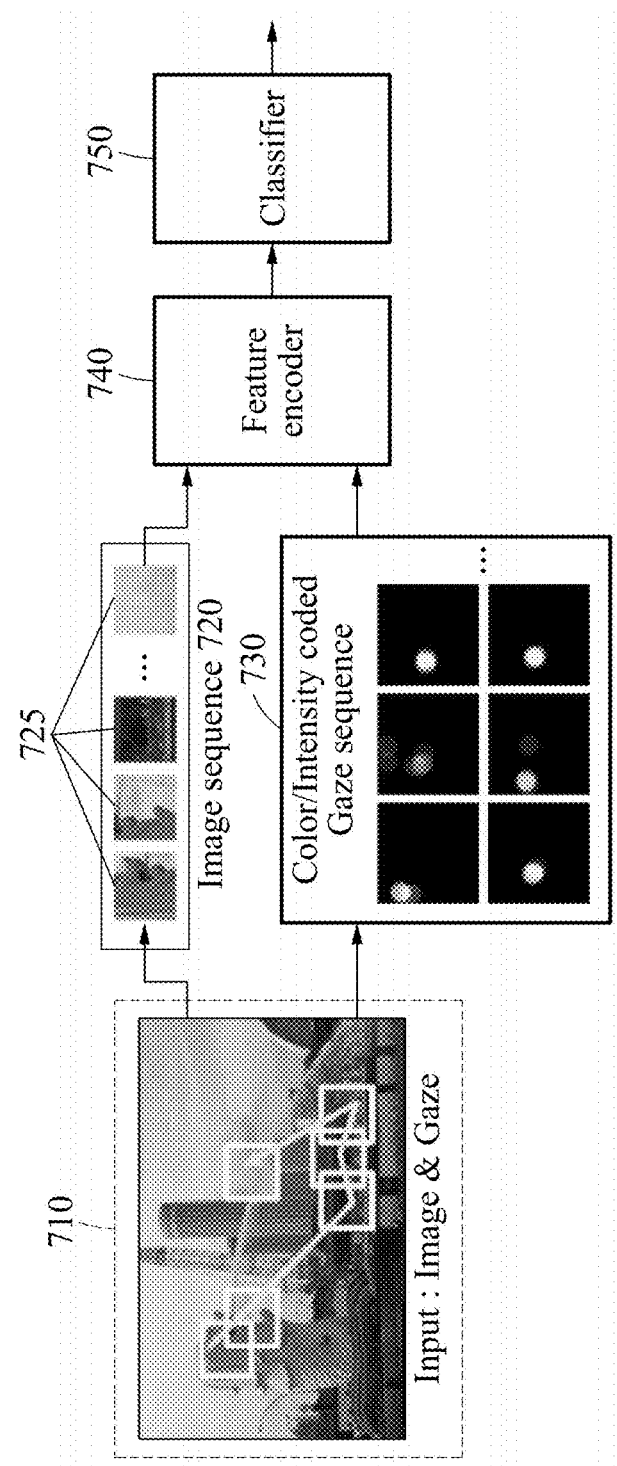
FIG. 7 illustrates an example of an estimating of a task.

FIG. 7 illustrates an example of predicting a task. Referring to the example of FIG. 7, an example of predicting a task of a user from an image sequence by an augmentation apparatus is illustrated.

In operation 710, an input image acquired by a camera and an image sequence of a user corresponding to the input image may be input. In operation 720, the augmentation apparatus may generate an image sequence by extracting partial images 725 based on gaze points onto which gazes of the user are mapped in the input image. The partial images 725 included in the image sequence may be extracted based on such gaze points and thus, may include spatial information of the image associated with gaze information, such as fixation information, as discussed further, above. Accordingly, it may be possible to identify the task of the user from the partial images 725 included in the image sequence. The spatial information may include, for example, a scan path corresponding to the trajectory of the user's fixation, a portion of the image covered by fixation, and a partial region to which the gaze is fixated repeatedly. In an example, the augmentation apparatus may generate the image sequence using the entire input image, without extracting the partial images as an initial step.

In operation 730, the augmentation apparatus may generate a coded image by visually encoding temporal information included in each gaze corresponding to the image sequence. In an example, the coded image may be generated by additionally encoding the temporal information included in each gaze corresponding to the image sequence. As a result, the accuracy of task estimation may improve. Operations 720 and 730, as described further above, may correspond to tasks involving image pre-processing.

In operation 740, the augmentation apparatus may obtain a feature by applying the image sequence or the coded image to a feature encoder or a feature extractor as an input. In this example, the feature may be in the form of a vector. The augmentation apparatus may obtain a feature representation corresponding to the pre-processed images using the above feature extractor, irrespective of a type of the image.

In operation 750, the augmentation apparatus may classify the task of the user by applying the feature to a classifier. In such an example, the classifier for processing sequential data included in the image sequence may include, for example, a DNN such as an RNN, an LSTM, or a DNC, or an SVM. However, these are only examples of classifiers that may be used in this context, and other classifiers may be used in other examples.

FIGS. 8A and 8B illustrate an example of determining relevant information. In detail, the example of FIG. 8A illustrates an example 810 of mapping tasks of a user for objects of interest and descriptors based on situations of the objects of interest, and the example of FIG. 8B illustrates a table 830 showing relationships between objects of interest and tasks of the user.

Thus, an augmentation apparatus may determine relevant information desired for the user by combining a type of a task of the user with an object of interest and/or a situation of the object of interest.

For example, the object of interest includes a driver, a vehicle, an environment, and a route, as shown in the example 810. In such an example, the environment may correspond to a driving environment. If the object of interest is a driver, the situation of the object of interest may include, for example, drowsiness recognition, or a cognitive situation such as light adaption or dark adaption. If the object of interest is a vehicle, the situation of the object of interest may include, for example, a speed, an operation method, a state of navigation, and/or a state of an air conditioner. If the object of interest is an environment, the situation of the object of interest may include, for example, landmark recognition, traffic checking, signal checking, and/or road conditions. Further, if the object of interest is a route, the situation of the object of interest may include, for example, a situation of checking an optimal route, and/or a situation of obtaining route information. However, these are only examples, noting that other properties of objects of interest such as a vehicle, environment, or route, as non-limiting examples, may be used as the situation of the object of interest.

The augmentation apparatus may select relevant information by limiting a sub-task being performed by the user based on the object of the interest of the user and the situation of the object of interest. In this context, the "sub-task" may be a subordinate concept of the task of the user, and may correspond to a task performed by the user in order to obtain relevant information. For example, if the sub-task is "distant traffic sign identification," the relevant information may be distant traffic sign information.

The augmentation apparatus may recognize the type of the object of interest in partial images included in the image sequence, the situation of the object of interest, and the state of the object of interest including the image state using the classifier and/or the neural network, e.g., as described above. In addition, the augmentation apparatus may recognize an environment currently faced by the user and an interaction relationship from the partial images included in the image sequence. The environment currently faced by the user may include, for example, drowsiness recognition, and danger recognition. Further, the interaction relationship may include, for example, route guide matching, and a current position on the route. However, these are only examples and other operational parameters may be used, as appropriate, in other examples.

For example, the task of the user may be "object identification," the object of interest of the user may be "distant traffic sign," and the situation of the object of interest may be "driving situation." However, this is only an example, and is not to be taken as limiting.

In such an example, the augmentation apparatus may determine a descriptor "environment" corresponding to the object of interest of the user "distant traffic sign" and the situation of the object of interest "driving situation." For example, the descriptor may be defined based on a qualitative analysis with respect to a targeting application field and/or a user behavior model. For example, a basic descriptor configuration may be defined based on a driver-vehicle-peripheral environment joint cognitive system assumed by a contextual control model (COCOM) and/or an extended control model (ECOM) for definition of descriptors in a driving environment. Subsequently, the descriptor may be defined using an approach of discovering an additional element and situation mapping so as to be suitable for a modern driving situation. The augmentation apparatus may determine relevant information by searching the example table 830 for a result of combining the descriptor "environment" and the task of the user "object identification." In such an example, in the table 830, the result of combining the descriptor "environment" and the task of the user "object identification" may correspond to distant traffic sign identification and/or landmark recognition. Thus, the augmentation apparatus may determine that the relevant information is "zooming in distant traffic sign information" and/or "zooming in landmark," by searching the table 830 for the result of combining the descriptor and the task of the user.

In another example, the task of the user may be "measurement", the object of interest of the user may be "close lane", and the situation of the object of interest may be "driving situation."

The augmentation apparatus may determine a descriptor "environment-vehicle" corresponding to the object of interest of the user "close lane" and the situation of the object of interest "driving situation." The augmentation apparatus may determine the relevant information by searching the table 830 for a result of combining the descriptor "environment-vehicle" and the task of the user "measurement." In such an example, in the table 830, the result of combining the descriptor "environment-vehicle" and the task of the user "measurement" corresponds to "determining whether to pass a narrow path." The augmentation apparatus may determine that the relevant information is information desired for determining whether to pass a narrow path, by searching the table 830 for the result of combining the descriptor and the task of the user.

FIG. 9 illustrates an example of a method of augmenting an image. Operations 910 through 950, and operation 970 of the example of FIG. 9 are the same as operations 210 through 260 of FIG. 2, and thus only operations different from those of FIG. 2 are described subsequently, for brevity.

In response to relevant information being obtained through operation 950, an augmentation apparatus may generate additional information for each situation corresponding to the relevant information, in operation 960.

In operation 970, the augmentation apparatus may visually augment an input image using the additional information for each situation. The augmentation apparatus may visually augment the input image by selectively providing the additional information for each situation corresponding to the relevant information. For example, the relevant information may be lane information obtained in association with map information of a road on which a driver is currently traveling. In such an example, the additional information may be a generated surface model of the road used for accurately overlaying an emphasized lane on a lane displayed in the input image. The augmentation apparatus may visually augment the input image by overlaying the emphasized lane onto the input image based on a 3D surface of the surface model of the road.

Figure 10A:
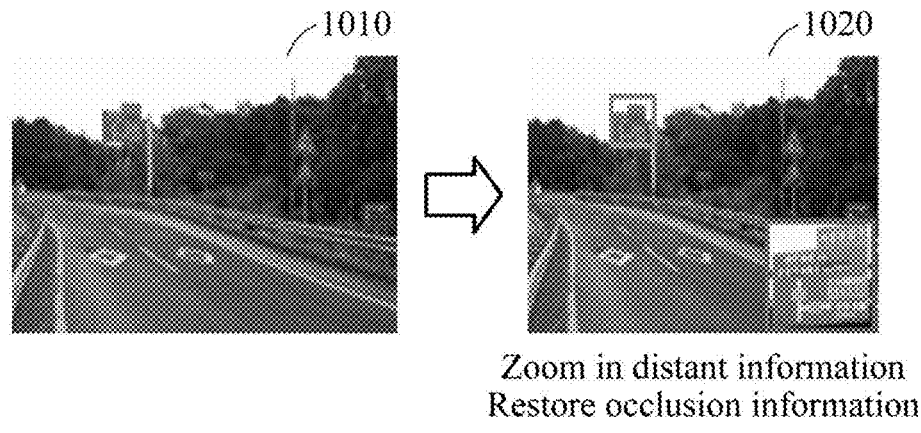
FIGS. 10A through 10C illustrate examples of input images and output images generated by visually augmenting the input images.
Figure 10B:
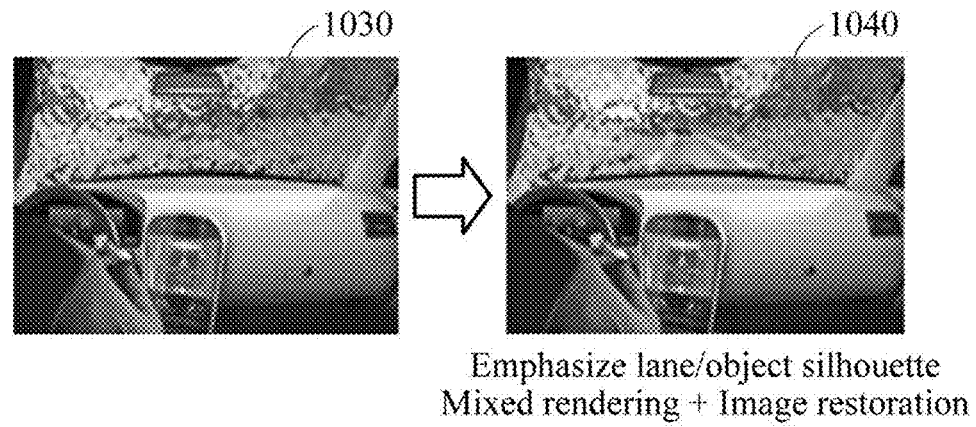
Figure 10C:
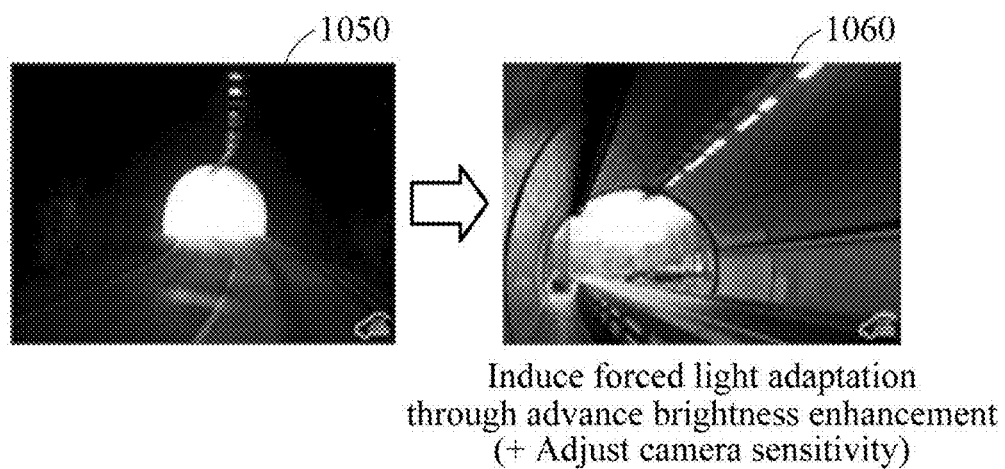

FIGS. 10A through 10C illustrate examples of input images and output images generated by visually augmenting the input images. Referring to the examples of FIG. 10A through 10C, input images 1010, 1030, and 1050 and output images 1020, 1040, and 1060 generated by visually augmenting the input images 1010, 1030, and 1050 are illustrated.

An augmentation apparatus may determine relevant information for the user by integrating an object of interest, a situation of the object of interest, and information obtained after classifying a task of the user through the process described further above. The augmentation apparatus may visually augment an input image or an AR application image by integrating the relevant information and/or additional information for each situation corresponding to the relevant information with the input image or the AR application image.

For example, in a driving environment as shown in the input image 1010, an object of interest of a user, for example, a driver, may be a specific traffic sign. The augmentation apparatus may recognize that the object of interest is the specific traffic sign, based on a gaze of the user, and may also recognize that the driver is performing an identification task for identifying the traffic sign well. The augmentation apparatus may then obtain information of the traffic sign as relevant information by retrieving map information of a road on which the driver is currently traveling. The augmentation apparatus may output the output image 1020 in which the information of the traffic sign is zoomed in and visually augmented. The augmentation apparatus may output the output image 1020 on a display, an HUD, or a windshield of a vehicle. However, these are only examples, and other devices for visual output may be used to share the output image 1020 with the user. In another example, the augmentation apparatus may recognize that the object of interest to which the driver gives attention in the driving environment as in the input image 1010 is a traffic sign, and that the traffic sign is occluded. In addition, the augmentation apparatus may recognize that the driver is performing an identification task for identifying the traffic sign well. In such an example, the augmentation apparatus may obtain an image and/or information of the occluded traffic sign as additional information for each situation corresponding to the relevant information, by retrieving map information associated with the traffic sign corresponding to the object of interest. The augmentation apparatus may output the image and/or the information of the occluded traffic sign by overlaying the image and/or the information of the occluded traffic sign on the traffic sign. By overlaying the visual data in this manner, it becomes easier to automatically communicate the various processor determined information of the augmentation apparatus to the user using machine learning determined aspects of an input image and/or user intent, interest, or desired with respect to such an input.

For example, in a driving environment in the rain as in the input image 1030, the object of interest of the user, for example, the driver, may be a lane on the road. The augmentation apparatus may recognize that the object of interest is the lane based on a gaze of the user, and may recognize that the driver is performing an identification task for identifying the lane of the road successfully. The augmentation apparatus may determine an image in which captured silhouettes of a distorted lane and/or objects are corrected, to be relevant information, by recognizing that the rain causes distortion in the input image 1030. The augmentation apparatus may output the output image 1040 restored from the input image 1030 by mixed rendering of the relevant information, that is, the image in which the silhouettes of the distorted lane and/or distorted objects are corrected to fix the distortions, with the input image 1030.

Further, in a driving environment in which light adaptation occurs due to a change in illumination when entering a tunnel as in the input image 1050, the object interest of the user, for example, the driver, may be a lane on a road. The augmentation apparatus may recognize that the object of interest may be the lane based on a gaze of the user, and recognizes that the driver may be performing an identification task for identifying the lane of the road more successfully.

The augmentation apparatus may determine an image in which silhouettes of a distorted lane and/or distorted objects are corrected, to be relevant information, by recognizing that a change in illumination causes reflection in the input image 1050. The augmentation apparatus may correct the input image 1050 by inducing forced light adaption through advance brightness enhancement with respect to the relevant information, that is, the silhouettes of the distorted lane and/or distorted objects. In such an example, the augmentation apparatus may additionally adjust the camera sensitivity, as appropriate. In an example, the augmentation apparatus may visually augment the input image 1050 as in the output image 1060 by zooming in a result of correction through induction of forced light adaption, with respect to the input image 1050.

Figure 11:
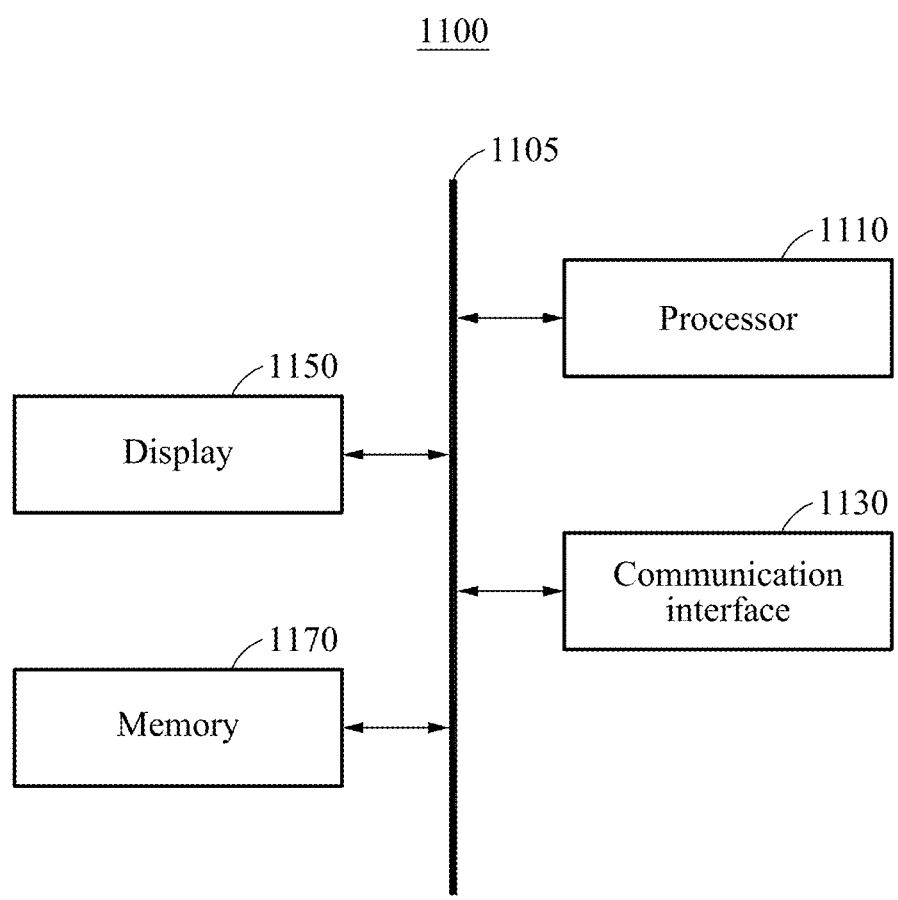
FIG. 11 illustrates an example of an apparatus with image augmentation.

FIG. 11 illustrates an example of an apparatus for augmenting an image. Referring to the example of FIG. 11, an augmentation apparatus 1100 may include a processor 1110, a communication interface 1130, a display 1150, and a memory 1170. The processor 1110, the communication interface 1130, the display 1150, and the memory 1170 may communicate with each other through a communication bus 1105. However, these elements are only an example, and the apparatus for augmenting an image may include additional or differing elements, as appropriate for use in other examples.

The processor 1110 may recognize any one or any combination of any two or more of an object of interest of a user, a situation of the object of interest, and a task of the user from partial regions of an input image based on a gaze of the user corresponding to the input image. The processor 1110 may determine relevant information used for the user, based on any two or any other combination of the object of interest of the user, the situation of the object of interest, and the task of the user. The processor 1110 may then visually augment the input image based on the relevant information.

The communication interface 1130 may acquire the input image and gaze information, including the gaze of the user corresponding to the input image.

The display 1150 may display the visually augmented image. By generating the visually augmented image, the augmentation apparatus is able to automatically have available machine learning results that produce useful information for communication to the user.

The memory 1170 may store the input image and the gaze information acquired through the communication interface 1130. Also, the memory 1170 may store the image visually augmented by the processor 1110. The memory 1170 may also store parameters of all trained machine learning models discussed herein, which can be loaded by the processor 1110 and implemented, based on a captured image, for example, as discussed above.

Further, the processor 1110 may perform one or more or all operations described with reference to FIGS. 1 through 10 e.g., by implementing one or more or all algorithms corresponding to those described with reference to FIGS. 1 through 10. The processor 1110 may be a data processing device implemented by hardware including a circuit having a physical structure to perform desired operations. For example, the desired operations may include instructions or codes included in a program. For example, the hardware-implemented data processing device may include a microprocessor, a central processing unit (CPU), a processor core, a multi-core processor, a multiprocessor, an application-specific integrated circuit (ASIC), and a field programmable gate array (FPGA). The processor 1110 may also include one or more processors, represented by the processor 1110.

The processor 1110 may execute the program, as discussed above, and may control the augmentation apparatus 1100 correspondingly. The program codes to be executed by the processor 1110 may be stored in the memory 1170.

The memory 1170 may store a variety of information generated during the processing process of the processor 1110. In addition, the memory 1170 may store a variety of data and programs. For example, the memory 1170 may include a volatile memory and/or a non-volatile memory. Also, the memory 1170 may include a high capacity storage medium such as a hard disk to store the variety of data.

The augmentation apparatuses, the augmentation apparatus 1100, communication bus 1105, processor 1110, communication interface 1130, display 1150, memory 1170, and other apparatuses, units, modules, devices, and other components described herein with respect to FIGS. 1-11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD- ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method with image augmentation, the method comprising:
   recognizing, based on a gaze of a user corresponding to an input image, any one or any combination of any two or more of an object of interest of the user, and a situation of the object of interest, from partial regions of the input image;
   recognizing a task being performed by the user by generating coded partial images by encoding temporal information to at least one RGB channel in the partial regions to which gazes corresponding to an image sequence are mapped in the input image, generating a coded image using the coded partial images, and predicting the task being performed by the user based on the image sequence and the coded image, wherein the image sequence including the partial regions of the input image is generated based on the gaze of the user corresponding to the input image;
   determining relevant information indicating an intention of the user based on any two or any other combination of the object of interest of the user, the situation of the object of interest, and the task of the user; and
   generating a visually augmented image by visually augmenting the input image based on the relevant information.

2. The method of claim 1, wherein the generating comprises:
   extracting partial images mapped to the gaze of the user from the input image; and
   generating the image sequence by sequentially combining the partial images.

3. The method of claim 2, wherein the extracting comprises extracting the partial images based on gaze information on which the gaze of the user is determined in the input image input at each timestep of timesteps used to track the gaze of the user.

4. The method of claim 1, wherein the recognizing comprises:
   recognizing either one or both of the situation of the object of interest and the object of interest included in the image sequence by applying the image sequence to a first neural network continued to perform object recognition; and
   recognizing the task being performed by the user by applying the image sequence to the second neural network continued to perform task recognition.

5. The method of claim 1, wherein the temporal information comprises any one or any combination of any two or more of a gaze trajectory, a velocity during eye movements, a duration of each fixation, whether the fixations are repeated on the partial regions, a count of recurrent/repeated fixations, an interval of the recurrent/repeated fixations, and a coverage area of the fixations.

6. The method of claim 1, wherein the predicting comprises:
   obtaining feature vectors corresponding to the image sequence based on the image sequence and the coded image; and
   classifying the task based on the feature vectors.

7. The method of claim 6, wherein the obtaining comprises:
   extracting first feature vectors from the partial regions to which gazes corresponding to the image sequence are mapped;
   extracting second feature vectors based on the coded image; and
   obtaining feature vectors corresponding to the image sequence by concatenating the first feature vectors and the second feature vectors.

8. The method of claim 1, wherein the situation of the object of interest comprises a situation in which any one or any combination of any two or more of occlusion, blur, distortion caused by rain, low illumination, and light reflection occurs with respect to the object of interest in the image sequence.

9. The method of claim 1, wherein the task of the user comprises any one or any combination of any two or more of search, object identification, matching, counting, measurement, and freely viewing.

10. The method of claim 1, wherein the recognizing comprises:
    setting a first window region and a second window region corresponding to the partial regions of different sizes in the input image, the second window region being larger than the first window region;
    resizing a resolution of the second window region by downsampling the second window region;
    detecting a first object candidate from the first window region, and detecting a second object candidate from the downsampled second window region; and
    recognizing the object of interest included in the input image based on either one or both of the first object candidate and the second object candidate.

11. The method of claim 1, wherein the determining comprises:
    determining a descriptor corresponding to the object of interest of the user and the situation of the object of interest; and determining the relevant information by searching a table for a result of combining the descriptor and the task of the user, the table including information of a relationship between the object of interest and the task of the user.

12. The method of claim 1, wherein the visually augmenting comprises either one or both of:
visually augmenting the input image by matching the relevant information to the input image; and
visually augmenting the input image by correcting the input image based on the relevant information.

13. The method of claim 1, wherein the visually augmenting comprises visually augmenting the input image by selectively providing additional information for each determined situation corresponding to the relevant information.

14. The method of claim 1, further comprising:
acquiring the input image and gaze information including a gaze of the user corresponding to the input image.

15. The method of claim 1, further comprising outputting the visually augmented image.

16. A non-transitory computer-readable storage medium storing instructions that, when executed by one or more processors, configure the one or more processors to perform the method of claim 1.

17. An apparatus with image augmentation, the apparatus comprising:
a communication circuit configured to acquire an input image and gaze information including a gaze of a user corresponding to the input image;
one or more processors configured to:
recognize, based on the gaze of the user, any one or any combination of an object of interest of the user, and a situation of the object of interest from partial regions of the input image,
recognize a task being performed by the user by applying the partial regions to a second neural network continued to perform task recognition, wherein the recognizing of the task includes generating coded partial images by encoding temporal information to at least one RGB channel in the partial regions to which gazes corresponding to an image sequence are mapped in the input image, and predicting the task being performed by the user based on the image sequence and a coded image generated from the coded partial images, and wherein the image sequence including the partial regions of the input image is generated based on the gaze of the user corresponding to the input image,
determine relevant information indicating an intention of the user based on any two or any combination of the object of interest of the user, the situation of the object of interest, and the task of the user, and visually augment the input image based on the relevant information, and
a display configured to display the visually augmented image.

18. A processor-implemented method with image augmentation, the method comprising:
recognizing, based on a gaze of a user corresponding to an input image, characteristics of the user from partial regions of the input image, including recognizing a task being performed by the user by generating coded partial images by encoding temporal information to at least one RGB channel in the partial regions to which gazes corresponding to an image sequence are mapped in the input image, and predicting the task being performed by the user based on the image sequence and a coded image generated from the coded partial images, wherein the image sequence including the partial regions of the input image is generated based on the gaze of the user corresponding to the input image;
determining relevant information used for the user, based on the recognized characteristics of the user;
generating a visually augmented image by visually augmenting the input image based on the relevant information.

19. The method of claim 1, wherein the characteristics of the user further comprise any one or any combination of any two or more of an object of interest of a user, a situation of the object of interest, and the task of the user from partial regions of an input image.

20. The method of claim 19, wherein the generating comprises:
extracting partial images mapped to the gaze of the user from the input image; and
generating the image sequence by sequentially combining the partial images.

21. The method of claim 1, further comprising outputting the visually augmented image.

* * * * *